United States Patent Office 3,629,261
Patented Dec. 21, 1971

3,629,261
CHLOROPYRIMIDINE DERIVATIVES
Gunther Beck and Hans Holtschmidt, Leverkusen, Germany, assignors to Farbenfabriken Bayer Aktiengesellschaft, Leverkusen, Germany
No Drawing. Filed Jan. 3, 1969, Ser. No. 788,934
Claims priority, application Germany, Jan. 12, 1968,
P 16 70 971.0
The portion of the term of the patent subsequent to
Apr. 28, 1987, has been disclaimed
Int. Cl. C07d 51/36
U.S. Cl. 260—251 R          8 Claims

ABSTRACT OF THE DISCLOSURE

A process for preparing 4,5,6-trichloropyrimidines and analogous compounds containing a further chlorine substituent or a radical in the 2-position comprising reacting

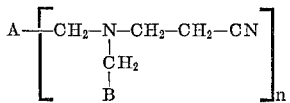

in which
A is lower alkyl, a carbocyclic or heterocyclic aromatic radical;
B—$CH_2$— is a radical which can be split off under the reaction conditions e.g. methyl;
and $n$ is 1 or 2;

with an excess of chlorine at a temperature of 0 to 250° C., optionally under UV irradiation. The resulting chloropyrimidines are fungicides and sporicides and are useful, as such, or as their fluoro analogs in preparing reactive dyestuffs.

---

The object of the invention comprises a process for the production of chloropyrimidine derivatives.

It has been found that chloropyrimidine derivatives are obtained by reacting compounds of the formula

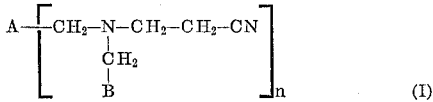

in which A denotes a lower alkyl radical or an aromatic-carbocyclic or aromatic-heterocyclic radical, B—$CH_2$— is a radical which can be split off under the reaction conditions, and $n$ stands for the number 1 or 2, optionally in mixture with an inert diluent or solvent, with an excess of chlorine at temperatures of about 0 to about 50° C., optionally with UV-irradiation, to form 4,5,6-trichloropyrimidine compounds which carry a possibly chlorinated radical A of the above meaning in the 2-position.

In the compounds of the Formula I, A and B may carry further substituents. A primarily containing —Cl, —Br, —F, —$NO_2$, —$N(CH_3)_2$ or, in the case where A is an aromatic-carboxylic or aromatic-heterocyclic radical, also lower alkyl, haloalkyl or cyano groups.

Examples of radicals A are: methyl, ethyl, 2-chloroethyl, n-propyl, phenyl; in the case where $n$ is 2, phenylene, especially 1,4-phenylene; 2-, 3- or 4-chlorophenyl, 2,4-, 2,6- or 3,4-dichlorophenyl, 2,3,4- or 2,4,5-trichlorophenyl, 3- or 4-nitrophenyl, 4-chloro-3-nitrophenyl, 6-chloro-3-nitrophenyl o- or p-toluyl, α- or β-naphthyl, 1,2,3,4-tetrahydronaphthyl-(6), α-, β- or γ-pyridyl, α-furyl, α-thienyl.

Particularly suitable radicals B—$CH_2$— which can split off under the reaction conditions are, in the case where A is a lower alkyl radical: methyl (B=H), and in the case where A is aryl or heteroaryl; either lower alkyl radicals, primarily methyl, or an arylmethyl or heterylmethyl radical B—$CH_2$—, such as benzyl or p-chlorobenzyl, which is identical with A—$CH_2$—.

Some of the starting compounds of the Formula I are known. Compounds of the Formula I which are suitable for the process are, for example, 3-(N-methyl-N-ethylamino)-propionitrile, 3 - (N - methyl-N-n-propylamino)-propionitrile, 3-(N-methyl-N-n-butylamino)-propionitrile, 3-(N,N-dibenzylamino) - propionitrile, 3-(N,N-dibenzylamino)-propionitrile, 3-(N-methyl-N-4-toluylmethylamino) - propionitrile, 3-(N-methyl-N-α-naphthylmethylamino)-propionitrile, 3-(N,N - di - α - naphthylmethylamino)-propionitrile, 3 - (N - methyl-N-α-pyridylmethylamino) - propionitrile, 3-(N,N-di-α-pyridylmethylamino)-propionitrile, 3-(N,N-di-α-furfurylamino) - propionitrile, 3 - (N,N-di-α-thienylmethylamino) - propionitrile, N,N'-dimethyl - N,N'-bis-β-cyanoethyl)-1,4-bis-(aminomethyl)-benzene.

The starting compounds of the Formula I are usually prepared by adding the secondary amine $$A{+}CH_2—NH—CH_2—B]_n$$

in which A, B and n have the same meaning as above, on to acrylonitrile. In the case where A is a carbocyclic aryl or heterocyclic aryl and B is H, it is also possible to react 3-(N-methylamino)-propionitrile with a heteryl- or arylmethyl halide, in the simplest case, for example, with benzyl chloride.

The amines of the Formula I can be used in the form of the free bases as well as in the form of their salts with inorganic or organic acids, for example, in the form of their hydrochlorides etc.

In general, the process according to the invention is carried out by mixing a compound of the Formula I with a diluent or solvent and then passing gaseous chlorine into or onto this mixture. The reaction with chlorine is carried out in the presence or absence of a catalyst. It is expedient to use an excess of chlorine for the reaction, but it is not advantageous to have an excess of chlorine at the start of the chlorination reaction, since the exothermic reaction would become too vigorous.

Diluents or solvents which are inert under the reaction conditions are all solvents which are stable to chlorine, for example, chlorinated aliphatic and aromatic hydrocarbons, such as chloroform, carbon tetrachloride, hexachloro-cyclopentadiene, octachloro - cyclopentene, 1,2,4-trichlorobenzene, 1,1,2,3,3-pentachloropropane, and chlorinated pyrimidines, such as e.g. 4,5,6-trichloropyrimidine or tetrachloropyrimidine. Chloroform is an especially suitable diluent or solvent.

A preferred method of carrying out the process consists in mixing a compound of the Formula I with a diluent or solvent preferably boiling below 100° C., primarily chloroform, and passing gaseous chlorine into or onto the mixture in an open or closed vessel. A strongly exothermic reaction initially occurs, frequently necessitating external cooling. When the exothermic reaction has subsided, the solution or the suspension resulting from the chlorinating reaction, may be exposed to an UV-irradiation while raising the temperature, to for example, 50 to 100° C., whereupon chlorination continues. In general, it will be particularly advantageous to heat to the boiling temperature of the solvent or diluent, i.e. to about 60 to 65° C. if chloroform is used, and to continue the chlorination until chlorine is no longer absorbed at the boiling temperature of the diluent or solvent. A diluent of higher boiling point (e.g. between 100 and 300° C.) can subsequently be added, and the first diluent or solvent can be removed, for example, by distillation; however, the original solvent, especially chloroform, can first be left in the mixture and distilled off in the further course of the chlorination. The reaction temperature is then slowly raised to 100 to 200° C. by heating, optionally with further UV-irradiation, and the chlorination is continued until the desired chloropyrimidine derivatives are obtained.

If the first exothermic stage at the start of the reaction is followed by further exothermic stages as the temperatures are raised in the further course of the chlorination, then it is expedient to reduce or turn off the external heating for this period of time.

The preferred proportion by volume between the diluent or solvent and a compound of the Formula I is 1 to 20 parts by volume of the diluent or solvent for every part by volume or weight of the compound I. It is also possible to work without a solvent but the use of a diluent or solvent is usually preferred.

If the chlorination is carried out in the presence of a chlorination catalyst, iron (III) chloride can be used for this purpose, for example.

In general, the process according to the invention leads to mixtures of 4,5,6-trichloropyrimidine derivatives whose radical A standing in the 2-position is completely or partially chlorinated in the course of the chlorinating reaction, or not chlorinated at all. The degree of chlorination of the radical A essentially depends on the nature of the radical A, the chlorination time, the reaction temperature and the catalysis of the reaction, for example, the UV-irradiation. In the case where A is a lower alkyl radical, it is necessary to carry out the chlorination for a prolonged period of time, for example, 15 to 25 hours, at 180 to 220° C. with intense UV-irradiation, in order to achieve a perchlorination of the alkyl radical. Reduction of the chlorinating temperature to 100 to 120° C. and omission of a catalysis of the reaction, such as UV-irradiation, leads to partially chlorinated alkyl radicals A. This is also true of alkyl radicals which are substituents of a (hetero-)aryl radical A. The resultant mixture of 2-substituted 4,5,6-trichloropyrimidines can be split up into the individual components in the usual manner, for example, by fractional distillation, possibly in a vacuum with the aid of a column, or, in the case of less volatile products, by fractional crystallisation.

If the final products are to be mainly chlorinated pyrimidine derivatives with the highest possible degree of chlorination of the radical A standing in the 2-position, the low-chlorinated components can be separated from the mixture initially obtained and these components can be recycled to the chlorination reaction.

Some compounds which can be obtained by the process according to the invention are already described in the literature. For example, 4,5,6-trichloro-2-phenyl-pyrimidine can be obtained according to J. Med. Chem. 7 1964], 808, in the following manner: chloro-malonic acid diethyl ester and benzamidine hydrochloride are condensed with sodium ethylate to form, with a yield of 58.5%, 5-chloro-4,6-dihydroxy-2-phenyl-pyrimidine which is reacted with phosphorus oxychloride in the presence of dimethyl-aniline to give 4,5,6-trichloro-2-phenyl-pyrimidine in a yield of 69.5% (total yield: 40.7%).

Other known 2-substituted 4,5,6-trichloropyrimidines can be obtained in basically the same manner.

Compared with these known processes, the new process according to the invention has the advantage of being more economical, since the starting compounds can be obtained very readily, primarily from acrylonitrile and secondary amines, and can be reacted in less expensive apparatus to form the desired chloropyrimidine derivatives.

Some of the chloropyrimidine derivatives prepared according to the invention have fungicidal and sporicidal properties as is known, for example, from U.S. patent specification No. 3,227,612. In addition, the products obtainable according to the present invention are valuable intermediates, for example, for the production of reactive dyestuffs or for further reaction with fluorinating agents with a complete or partial exchange of Cl for F.

EXAMPLE 1

250 g. (2.23 mol) 3-(N-methyl-N-ethylamino)-propionitrile and about 1 litre of chloroform are placed in a three-neck flask of 2 litres capacity, which is fitted with thermometer, gas feed tube, stirrer and reflux condenser. Starting at about 25° C., a dry chlorine current (about 2 litres per minute) is first passed through the gas feed tube over the reaction mixture with intense stirring and while externally cooling with ice. The supply of chlorine and the cooling are so adjusted that the reaction temperature remains between about 25 and 35° C. The external cooling is continued and when the reaction temperature falls to below 25° C. although the chlorine supply is increased to about litres per minute, the chlorine current is passed into the reaction mixture to maintain the reaction temperature between about 25 and 35° C. When the exothermic reaction has subsided, the reaction mixture is treated with an excess of chlorine while heating to the reflux temperature of chloroform (about 60° C.) until chlorine is no longer absorbed. After turning off the water cooling of the reflux condenser, the chloroform is first distilled off and the temperature is subsequently raised by about 10 to 20° C. per hour while introducing more excess chlorine, until a final temperature of about 160° C. has been reached. The total duration of the chlorination reaction amounts to about 10 to 12 hours. The reaction passes through an exothermic stage at about 80° C. and again at about 150° C., and the external heating is turned off during this time in order to prevent the temperature from rising too fast. A dry nitrogen current is subsequently passed through the reaction mixture in order to drive off the dissolved excess chlorine and hydrogen chloride.

Fractional distillation yields, after first runnings without a constant boiling point, a fraction of uniform boiling point at about 135° C./0.5 mm. Hg, which solidifies in the receiver. The yield is about 370 g. (appr. 62% of theory) of 4,5,6-trichloro-2-(dichloromethyl)-pyrimidine which, after recrystallisation from petroleum ether, forms colourless small needles of melting point 71 to 72° C.

*Analysis.*—$C_5HCl_5N_2$ (266.3): Calc. (percent): C, 22.55; H, 0.38; Cl, 66.56; N, 10.51. Found (percent): C, 22.7; H, 0.7; Cl, 66.1; N, 10.5.

EXAMPLE 2

The process is first carried out in analogy with Example 1. The reaction product obtained at 160° C. is then further chlorinated at 190 to 210° C. with intense UV-irradiation for about 20 hours. Working up is carried out as described in Example 1. A fraction having a constant boiling point of about 134° C./2 mm. Hg is obtained, which solidifies in the receiver. The yield amounts to about 475 g. (appr. 56% of theory) of 4,5,6-trichloro-2-(trichloromethyl)-pyrimidine of M.P. 63 to 64° C. (methanol).

*Analysis.*—$C_5Cl_6N_2$ (300.8): Calc. (percent): C, 19.96; Cl, 70.73; N, 9.31. Found (percent): C, 20.1; Cl, 70.5; N, 9.3.

EXAMPLE 3

In a manner analogous to Example 2 and starting from 3 - (N - methyl - N-n-propylamino)-propionitrile, 4,5,6-trichloro-2-(pentachloroethyl)-pyrimidine of melting point 112 to 113° C. (methanol) is obtained in a yield of 47%.

*Analysis.*—$C_6Cl_8N_2$ (383.7): Calc. (percent): C, 18.78; Cl, 74.91; N, 7.30. Found (percent): C, 19.4; Cl, 74.1; N, 7.3.

EXAMPLE 4

400 g. (2.30 mol) 3-(N-methyl-N-benzylamino)-propionitrile are diluted with about 2 litres of chloroform and chlorinated in a three-neck flask of 4 litres capacity in analogy with the instructions of Example 1. After a total chlorination time of about 12 hours and a maximum temperature of about 150° C., a yellow crude product is obtained the main fraction of which boils at approximately 140 to 150° C./0.15 mm. Hg and solidifies in the receiver as a colourless material. The yield is about 400 g. (appr. 67% of theory) of 4,5,6-trichloro-2-phenyl-pyrimidine which melts at 127 to 128° C. after recrystallisation from white spirit.

*Analysis.*—$C_{10}H_5Cl_3N_2$: Calc. (percent): C, 46.28; H, 1.94; Cl, 40.99; N, 10.80. Found (percent): C, 46.5; H, 2.1; Cl, 40.7; N, 10.7.

EXAMPLE 5

When 180 g. (0.72 mol) 3-(N,N-dibenzylamino)-propionitrile are used as starting material and the process is otherwise carried out in analogy with Example 4, 165 g. (88% of theory) of 4,5,6-trichloro-2-phenyl-pyrimidine of M.P. 127 to 128° C. are obtained.

The 3-(N,N-dibenzylamino)-propionitrile which has not yet been described is obtained in a simple manner from dibenzylamine (1 mol), acrylonitrile (1,2 mol) and glacial acetic acid (12% by weight, referred to dibenzylamine), by heating under reflux for several hours; B.P. 174° C./0.1 mm. Hg.

EXAMPLE 6

270 g. (1.0 mol) N,N'-dimethyl-N,N'-bis-(p-cyano-ethyl)-1,4-bis-(aminomethyl)-benzene are dissolved in about 1 litre of chloroform and chlorinated in a three-neck flask of 4 litres capacity in analogy with the instructions of Example 1. From the start of the reaction, a yellowish precipitate of a slimy-viscous consistency is increasingly formed, which becomes more and more clotted. When the suspension no longer absorbs chlorine at the reflux temperature of chloroform, about 1.5 litres of 1,2,4-trichlorobenzene are added, the water cooling of the reflux condenser is turned off, and the temperature is raised by about 10° C. per hour while the introduction of excess chlorine is continued. At about 90 to 100° C., the suspension begins slowly to dissolve. Chlorination is continued up to about 190 to 200° C. When the reddish reaction solution slowly cools down to room temperature, a finely crystalline precipitate of 1,4-bis-(4,5,6-trichloro-2-pyrimidinyl)-benzene separates and this can be increased by concentrating the mother liquor to about ⅓. Recrystallisation from chlorobenzene with the addition of some active charcoal yields colourless needles of melting point 313 to 314° C. Yield 44 g. (appr. 10% of theory).

*Analysis.*—$C_{14}H_4Cl_6N_4$ (440.9): Calc. (percent): C, 38.14; H, 0.92; Cl, 48.25; N, 12.71. Found (percent): C, 38.7; H, 1.2; Cl, 47.7; N, 12.7.

The N,N'-dimethyl-N,N'-bis-(β-cyanoethyl)-1,4-bis-(aminomethyl)-benzene which has not yet been described is obtained in a simple manner from 1,4-bis-(methylaminomethyl)-benzene (1 mol) and acrylonitrile (2.4 mol) by heating on a boiling water bath for 3 hours. After drawing off the excess acrylonitrile in a vacuum, the product remains in the form of a colourless oil which solidifies upon cooling. Melting point 56 to 58° C.

EXAMPLE 7

300 g. (1.6 mol) 3 - (N-methyl-N-p-toluylmethylamino)propionitrile (B.P. 173° C./18 mm. Hg) are diluted with about 1 litre of chloroform and chlorinated in a three-neck flask of 3 litres capacity in analogy with the instructions of Example 1. The reaction passes through a further appreciably exothermic stage at about 100° C. The total chlorination time amounts to about 12 hours, including about 2 hours at a final temperature of 200° C. with simultaneous UV-irradiation. At B.P. 200 to 210° C./0.2 mm. Hg there are obtained about 340 g. (appr. 56.5% of theory) of 4,5,6 - trichloro - 2-(4'-trichloromethylphenyl)-pyrimidine which solidifies in the receiver and melts at 143 to 145° C. after recrystallisation from white spirit.

*Analysis.*—$C_{11}H_4Cl_6N_2$ (376.9): Calc. (percent): C, 35.05; H, 1.07; Cl, 56.45; N, 7.43. Found (percent): C, 35.2; H, 1.3; Cl, 56.0; N, 7.5.

As by-product 4,5,6-trichloro-2-(2'- or 3'-chloro-4'-trichloromethylphenyl)-pyrimidine is obtained; this is less readily soluble and can therefore be separated from the main product described above by fractional crystallisation. Melting point 215 to 216° C. (from white spirit).

EXAMPLE 8

The process is carried out in analogy with Example 7 with the difference that chlorination is carried out without UV-irradiation only up to a maximum temperature of 110° C. until the absorption of chlorine is terminated. Recrystallisation from petroleum ether gives long white needles of melting point 152 to 153° C. Yield 155 g. (31.5% of theory) of 4,5,6 - trichloro - 2-(4'-[chloromethyl]-phenyl)-pyrimidine.

*Analysis.*—$C_{11}H_6Cl_4N_2$ (308.0): Calc. (percent): C, 42.89; H, 1.96; Cl, 46.05; N, 9.10. Found (percent): C, 42.8; H, 2.1; Cl, 45.6; N, 9.2.

Example 9

224 g. (1.0 mol) 3-(N-methyl-N-α-naphthylmethylamino)-propionitrile (B.P. 154° C./0.15 mm. Hg) are diluted with about 1 litre of chloroform and chlorinated in analogy with the instructions of Example 1 up to a final temperature of about 150° C. Fractional distillation in a high vacuum yields in the boiling range of 180 to 190° C./0.6 mm. Hg a substance which largely solidifies in the receiver and forms capillary colourless needles of melting point 247 to 248° C. after recrystallisation from white spirit. Yield about 95 g. (appr. 23% of theory) of 4,5,6-trichloro-2-(trichloro-1-naphthyl)-pyrimidine. According to the MPR-spectrum it is probable that the three chlorine atoms stand in the 5,6,7-position of the naphthalene skeleton.

*Analysis.*—$C_{14}H_4Cl_6N_2$ (412.9): Calc. (percent): C, 40.72; H, 0.98; Cl, 51.52; N, 6.78. Found (percent): C, 41.6; H, 1.0; Cl, 50.7; N, 6.8.

EXAMPLE 10

150 g. (0.875 mol) 3-(N-methyl-N-α-pyridylmethylamino)-propionitrile (B.P. 110° C./0.06 mm. Hg) are diluted with about 1 litre of chloroform and chlorinated in a three-neck flask of 2 litres capacity in analogy with the instructions of Example 1. From the start of the reaction, a yellowish precipitate of a smeary consistency increasingly separates. When the suspension no longer absorbs chlorine or the reflux temperature of chloroform, about 0.5 litre of 1,2,4-trichlorobenzene are added, the water cooling of the reflux condenser is turned off, and the temperature is raised by about 10° C. per hour while the introduction of excess chlorine is continued. An exothermic reaction stage occurs from 120 to 130° C., while the precipitate slowly dissolves. Chlorination is subsequently continued at 200 to 220° C. for about 10 hours. After drawing off the trichlorobenzene and the more volatile components in a water jet vacuum, there remain about 250 g. of a brown-red oil from which about 40 g. (appr. 15.5% of theory) of solid 4,5,6-trichloro-2-(6'-chloro-2'-pyridyl)-pyrimidine can be precipitated by stirring with petroleum ether; they form yellow columns of M.P. 165 to 165.5° C. after recrystallisation from white spirit.

*Analysis.*—$C_9H_3Cl_4N_3$ (294.9): Calc. (percent): C, 36.64; H, 1.03; Cl, 48.09; N, 14.25. Found (percent): C, 36.7; H, 1.1; Cl, 48.0; N, 14.1.

We claim:
1. Process for the production of chloropyrimidine derivatives comprising reacting a compound of the formula

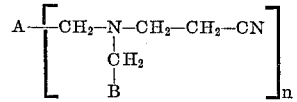

in which
A is a lower alkyl, lower alkyl substituted with —Cl, —Br, —F, —NO₂ or N(CH₃)₂, or an unsubstituted or substituted aromatic radical selected from the group consisting of phenyl, phenylene, α- or β-naphthyl, 1,2,3,4-tetrahydronaphthyl-(6), α-pyridyl, β-pyridyl, γ-pyridyl, α-furyl, and α-thienyl wherein said substituents are selected from the group consisting of —Cl, —Br, —F, —NO$_2$, —N(CH$_3$)$_2$, lower alkyl, lower haloalkyl and CN;

B is H when A is lower substituted or unsubstituted alkyl;

B is lower alkyl or is identical to A when A is an aromatic radical; and $n$ is 1 or 2;

with an excess of chlorine at a temperature of 0 to 250° C. to form a 4,5,6-trichloropyrimidine.

2. The process of claim 1 in which A is 2-chloroethyl, lower alkyl, phenyl, phenylene, 2-, 3-, or 4-chlorophenyl, 2,4-, 2,6- or 3,4-dichlorophenyl, 2,3,4- or 2,4,5-trichlorophenyl, 3- or 4-nitrophenyl, 4-chloro-3-nitrophenyl, 6-chloro-3-nitrophenyl, o- or p-toluyl, α- or β-naphthyl, 1,2,3,4-tetrahydronaphthyl-(6), α, β or γ-pyridyl, α-furyl or α-thienyl.

3. The process of claim 1 in which said compound is 3-(N-methyl-N-ethylamino)-propionitrile.

4. The process of claim 1 in which said compound is 3-(N-methyl-N-n-propylamino)-propionitrile.

5. The process of claim 1 in which said compound is 3-(N-methyl-N-benzylamino)-propionitrile or 3-(N,N-dibenzylamino)-propionitrile.

6. The process of claim 1 in which said compound is 3-(N-methyl-N-p-toluylmethylamino)-propionitrile.

7. The process of claim 1 which is conducted in the presence of UV-radiation.

8. The process of claim 1 which is conducted in the presence of an inert diluent or solvent.

References Cited

UNITED STATES PATENTS

| | | | |
|---|---|---|---|
| 3,227,612 | 1/1966 | Gershon | 167—39 |
| 3,389,069 | 6/1968 | Holtschmidt et al. | 204—158 |
| 3,509,032 | 4/1970 | Beck et al. | 204—158 |

ALEX MAZEL, Primary Examiner

R. V. RUSH, Assistant Examiner

U.S. Cl. X.R.

204—158 HA; 260—256.4 R